United States Patent
Meng (10) Patent No.: US 11,263,312 B1
(45) Date of Patent: Mar. 1, 2022

(54) SECURE SERVICE REQUEST PROCESSING METHODS AND APPARATUSES

(71) Applicant: ALIPAY (HANGZHOU) INFORMATION TECHNOLOGY CO., LTD., Zhejiang (CN)

(72) Inventor: Fei Meng, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/348,572

(22) Filed: Jun. 15, 2021

(30) Foreign Application Priority Data

Sep. 18, 2020 (CN) .......................... 202010989975.7

(51) Int. Cl.
G06F 21/53 (2013.01)
G06F 21/73 (2013.01)
G06F 21/60 (2013.01)
G06F 21/62 (2013.01)
G06F 21/32 (2013.01)

(52) U.S. Cl.
CPC .............. G06F 21/53 (2013.01); G06F 21/32 (2013.01); G06F 21/602 (2013.01); G06F 21/6227 (2013.01); G06F 21/73 (2013.01); G06F 2221/2149 (2013.01)

(58) Field of Classification Search
CPC ........ G06F 21/53; G06F 21/32; G06F 21/602; G06F 21/6227; G06F 21/73; G06F 2221/2149
See application file for complete search history.

(56) References Cited

U.S. PATENT DOCUMENTS

| 10,699,015 B1* | 6/2020 | Liu ........................ G06F 21/57 |
| 2014/0129917 A1* | 5/2014 | Cui ........................ G06F 9/541 |
| | | 715/234 |
| 2017/0148017 A1* | 5/2017 | Hu ...................... G06Q 20/3226 |
| 2017/0169213 A1* | 6/2017 | Zhao ..................... G06F 21/629 |
| 2020/0151320 A1 | 5/2020 | Li et al. |

(Continued)

FOREIGN PATENT DOCUMENTS

WO    WO2018000370    1/2018

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Beemnet W Dada
(74) *Attorney, Agent, or Firm* — Fish & Richardson P.C.

(57) ABSTRACT

Disclosed herein are methods, systems, and media for processing service requests. One of the methods includes: receiving, from a client application and by a trusted application, a first service request for executing a first service by the trusted application, wherein the first service request comprises a first expression and an input parameter of the first expression, and the first expression specifies a plurality of target interfaces related to the first service and a sequence of the plurality of target interfaces; executing, by the trusted application and based on the input parameter, the plurality of target interfaces according to the sequence to obtain a target execution result; and returning, by the trusted application to the client application, the target execution result responsive to the first service request.

17 Claims, 6 Drawing Sheets

(56) References Cited

U.S. PATENT DOCUMENTS

2020/0167503 A1\* 5/2020 Wei .......................... G06F 21/64
2021/0006405 A1\* 1/2021 Gozutok ................. H04L 9/321
2021/0240807 A1 8/2021 Wang et al.

OTHER PUBLICATIONS

Nakamoto, "Bitcoin: A Peer-to-Peer Electronic Cash System," www.bitcoin.org, 2005, 9 pages.
Extended European Search Report in European Application No. 21181307.6, dated Dec. 10, 2021, 11 pages.

\* cited by examiner

SECURE SERVICE REQUEST PROCESSING METHODS AND APPARATUSES

CROSS-REFERENCE TO RELATED APPLICATIONS

This application claims priority to Chinese Patent Application No. 202010989975.7, filed on Sep. 18, 2020, which is hereby incorporated by reference in its entirety.

TECHNICAL FIELD

Embodiments of the present specification relates to the field of computer technologies, and in particular, to secure service request processing methods and apparatuses.

BACKGROUND

To support secure application scenarios, an end-user device is usually divided into two environments in terms of software and hardware. One of the environments is a rich execution environment (REE) that users can install any application program upon actual needs. The application program installed in the REE can be referred to as a client application. The other is a trusted execution environment (TEE). In the TEE, only trusted or verified application programs can be installed or run. The application program installed in the TEE can be referred to as a trusted application (TA).

Since the user can install any application program in the REE, the security of the REE is relatively low. Therefore, the client application needs to invoke the TA to process some service requests with higher security needs. However, since the service request of the client application changes frequently, a huge cost would be consumed if the TA is frequently upgraded or changed to process the frequently changing service request.

Therefore, a solution is needed to simply and effectively process the service request of the client application.

SUMMARY

One or more embodiments of the present specification describe secure service request processing methods and apparatuses, which can ensure both security and flexibility of service request processing.

According to a first aspect, a secure service request processing method is provided, including the following: a first service request for requesting a trusted application to execute a first service is received from a client application, where the first service request includes a first expression and an input parameter of the first expression, and the first expression specifies a plurality of target interfaces related to the first service and an invoking sequence of the plurality of target interfaces; based on the input parameter, the plurality of target interfaces are executed in turn in the invoking sequence to obtain a target execution result; and the target execution result is used as the processing result of the first service request, and the processing result of the first service request is returned to the client application.

According to a second aspect, a secure service request processing method is provided, including the following: a current service request for requesting a trusted application to execute a first service is received from a client application, where the current service request includes a current interface and an input parameter of the current interface; and the current interface is any one of a plurality of target interfaces that are related to the first service and are in a specified invoking sequence; the current interface is executed based on the input parameter to obtain a current execution result; and an indication of the current execution result is returned to the client application, such that the client application determines a target execution result based on the indication of the current execution result when determining that the current interface is the last interface.

According to a third aspect, a secure service request processing method is provided, including the following: a first expression related to a first service is obtained when a user triggers a client application to execute the first service, where the first expression specifies a plurality of target interfaces related to the first service and an invoking sequence of the plurality of target interfaces; an input parameter of the first expression is determined; a first service request for requesting a trusted application to execute the first service is transmitted to the trusted application, where the first service request includes the first expression and the input parameter; and a target execution result returned by the trusted application is received after the trusted application executes the plurality of target interfaces based on the input parameter.

According to a fourth aspect, a secure service request processing method is provided, including the following: a plurality of target interfaces that are related to a first service and are in a specified invoking sequence are obtained when a user triggers a client application to execute the first service; the plurality of target interfaces are used as a current interface in turn, and the current interface is invoked, where the step that the current interface is invoked includes the following: an input parameter of the current interface is determined; a current invoking request that includes the current interface and the input parameter of the current interface is transmitted to the trusted application; and an indication of a current execution result returned by the trusted application is received after the trusted application executes the current interface based on the input parameter; and a target execution result is determined based on the indication of the current execution result after all the plurality of target interfaces are invoked.

According to a fifth aspect, a secure service request processing apparatus is provided, including: a receiving unit, configured to receive, from a client application, a first service request for requesting a trusted application to execute the first service, where the first service request includes a first expression and an input parameter of the first expression, and the first expression specifies a plurality of target interfaces related to the first service and an invoking sequence of the plurality of target interfaces; an execution unit, configured to execute, based on the input parameter, the plurality of target interfaces in turn in the invoking sequence to obtain a target execution result; and a return unit, configured to use the target execution result as a processing result of the first service request, and return the processing result of the first service request to the client application.

According to a sixth aspect, a secure service request processing apparatus is provided, including: a receiving unit, configured to receive, from a client application, a current service request for requesting a trusted application to execute a first service, where the current service request includes a current interface and an input parameter of the current interface, and the current interface is any one of the plurality of target interfaces that are related to the first service and are in a specified invoking sequence; an execution unit, configured to execute the current interface based on the input parameter to obtain a current execution result;

and a return unit, configured to return an indication of the current execution result to the client application, such that the client application determines a target execution result based on the indication of the current execution result when determining that the current interface is the last interface.

According to a seventh aspect, a secure service request processing apparatus is provided, including: an acquisition unit, configured to obtain a first expression related to a first service when a user triggers the client application to execute the first service, where the first expression specifies a plurality of target interfaces related to the first service and an invoking sequence of the plurality of target interfaces; a determining unit, configured to determine an input parameter of the first expression; a transmitting unit, configured to transmit, to a trusted application, a first service request for requesting a trusted application to execute the first service, where the first service request includes the first expression and the input parameter; and a receiving unit, configured to receive a target execution result returned by the trusted application after the trusted application executes the plurality of target interfaces based on the input parameter.

According to an eighth aspect, a secure service request processing apparatus is provided, including: an acquisition unit, configured to obtain a plurality of target interfaces that are related to a first service and are in a specified invoking sequence when a user triggers a client application to execute the first service; an invoking unit, configured to use the plurality of target interfaces as the current interface in turn, and invoke the current interface, where the invoking the current interface includes: determining an input parameter of the current interface; transmitting a current invoking request that includes the current interface and the input parameter of the current interface to the trusted application; and receiving an indication of a current execution result returned by the trusted application after the trusted application executes the current interface based on the input parameter; and a determining unit, configured to determine a target execution result based on the indication of the current execution result after all the plurality of target interfaces are invoked.

According to a ninth aspect, a storage medium is provided, which stores computer programs, where when the computer programs are executed in a computer, the computer implements the method according to the first aspect, the method according to the second aspect, the method according to the third aspect, or the method according to the fourth aspect.

According to a tenth aspect, a computing device is provided, including a memory and a processor, where the memory stores executable codes, and when executing the executable codes, the processor implements the method according to the first aspect, the method according to the second aspect, the method according to the third aspect, or the method according to the fourth aspect.

According to the secure service request processing methods and apparatuses provided by one or more embodiments of the present specification, the trusted application deployed in the TEE can externally provide the several interfaces, and each interface corresponds to one functional unit of the trusted application. Therefore, the client application can request the trusted application to execute services by invoking the several interfaces. It should be understood that if a service requested by the client application through invoking interfaces changes, the client application only needs to perform: re-selecting respective target interfaces; and/or re-creating the invoking sequence of the respective target interfaces, while the trusted application does not need to be upgraded or changed. Thus, service request processing can be more flexible, and the maintenance cost of the trusted application can be reduced.

BRIEF DESCRIPTION OF DRAWINGS

To describe the technical solutions in the embodiments of the present specification more clearly, the following briefly describes the accompanying drawings needed for describing the embodiments. Clearly, the accompanying drawings in the following description show merely some embodiments of the present specification, and a person of ordinary skill in the art can still derive other drawings from these accompanying drawings without creative efforts.

DESCRIPTION OF EMBODIMENTS

The following describes the solutions provided in the present specification with reference to the accompanying drawings.

The inventive concept of the present solution is described below before describing the solutions provided by the present specification.

As previously described, a client application would request a trusted application to execute services. In conventional technologies, development personnel directly compile corresponding processing logic for each service provided by the trusted application externally. Then, the client application transmits corresponding parameters and executes corresponding processing logic when requesting to execute the service. It can be understood that in conventional technologies, the entire processing flow of a service request is deployed in a trusted execution environment (TEE).

It is worthwhile to note that when the entire processing flow is deployed in the TEE, development personnel need to manually modify corresponding processing logic once the service request of a certain service changes. This fails to satisfy the flexibility need of the service request processing, and increases the maintenance cost of the trusted application.

Therefore, the inventor of the present application proposes to pre-abstract several interfaces for the trusted application and externally expose (or provide) the several interfaces.

Specifically, several complete and self-consistent interfaces with independent data flows can be abstracted based on the capability of the TEE. Each interface can correspond to one functional unit of the trusted application. Since the interface described in the present specification merely corresponds to one functional unit instead of the complete processing logic (constituted by several functional units) of the provided service, the interface can be referred to as an atomic interface.

When each interface is named based on the name of the corresponding functional unit, the several previously abstracted interfaces can include, but are not limited to a key generating interface: Generate( ); an encryption interface: Encrypt( ); a storage interface: storage( ); a data reading interface: read( ); a decryption interface; Decrypt( ); a signing interface: sign( ); a verification interface: verify( ), a data acquisition interface GetFrame( ), etc. Usually, these interfaces can be reused.

After the several previous interfaces are abstracted, the trusted application can externally expose the several interfaces, so the client application can request the trusted application to execute a certain service by invoking a combination of the previously mentioned interfaces. One service of the trusted application corresponds to at least one interface. For example, the client application can request, by invoking the key generating interface, the encryption interface, and the storage interface, the trusted application to execute the key management service. For another example, the client application can request, by invoking the verification interface, the data acquisition interface, the reading interface, and the signing interface, the trusted application to execute a fingerprint payment service.

In the present solution, the client application can invoke respective interfaces related to a certain service in the following two modes.

The first mode is invoking respective interfaces in turn. Such invoking mode applies to service request processing cannot be interrupted, which means that processing results cannot be used if not all interfaces are invoked. For example, when the client application requests the key management service, a stored encryption key cannot be used if the storage interface is directly invoked instead of invoking the key generating interface and the encryption interface.

In the previous first mode, the control portion (interface selection and sorting) of the service request processing flow is deployed in a rich execution environment (REE), and data is circulated among respective interfaces of the TEE. Therefore, flexibility of service requests and data security are ensured at the same time.

The second mode is invoking respective interfaces based on expressions. Specifically, expressions compiled based on respective interfaces can be transmitted to the trusted application at a single time. In such invoking mode, service request processing can be interrupted. That is, malicious attackers can directly skip previous interfaces, and execute subsequent interfaces to obtain a fake processing result, and the fake processing result cannot be identified. For example, when requesting the fingerprint payment service, the client application skips the verification interface, the data acquisition interface and the reading interface, and directly invokes the signing interface to obtain a fake signing result. The fake signing result and the true signing result are equivalent, and cannot be distinguished from each other.

In the previous second mode, part of the control portion of the service request processing flow is deployed in the TEE, but since the expressions are compiled in the REE, the flexibility of service requests can still be improved and ensured.

It is worthwhile to note that in the previous two modes, by invoking the several interfaces externally exposed by the trusted application, the client application can request the trusted application to execute most services. Therefore, the present solution is generally applicable.

At last, although processing logic of service requests is diversified, the variation of the processing logic is usually reflected at the control portion of the processing flow. Therefore, unless underlying capabilities need to be added or modified, the trusted application does not need to upgrade, thus satisfying the flexibility need of service request processing and reducing the release and upgrade frequency of the trusted application.

The previous describes the inventive concept provided by the present specification. The present solution can be obtained based on the inventive concept. The present solution is described in detail below.

Figure 1:
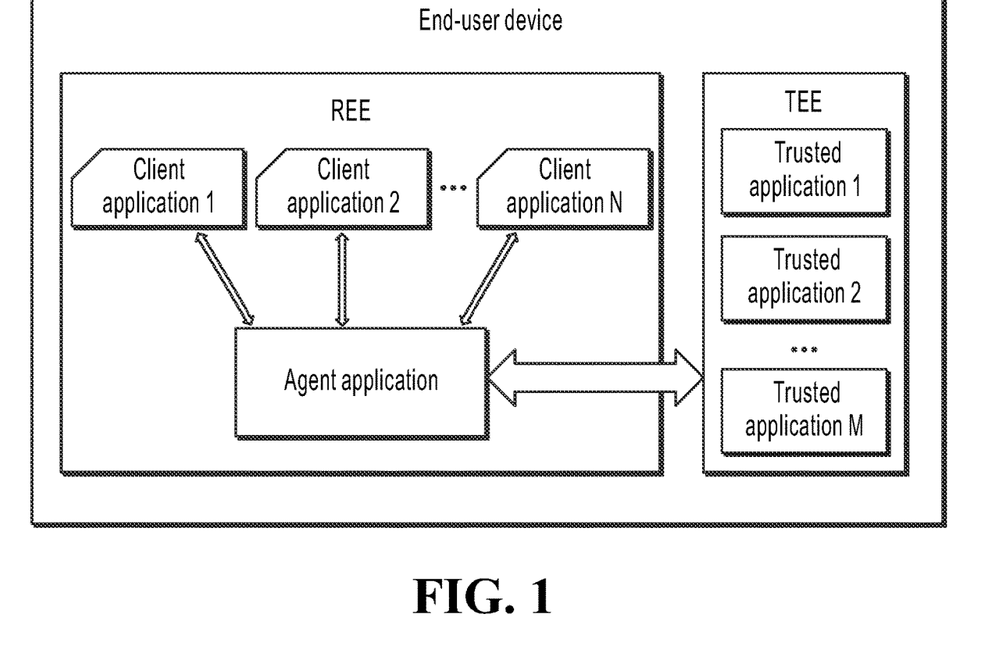
FIG. 1 is a schematic diagram illustrating an end-user device, according to the present specification.

FIG. 1 is a schematic diagram illustrating an end-user device according to the present specification. In FIG. 1, the end-user device is divided into two environments in terms of software and hardware. One of the environments is an REE, and the other is a TEE. The REE is an open environment, which can support rich application programs, for example, payment applications, instant chat applications, video play applications, etc. In the present specification, the application programs deployed in the REE can be referred to as client applications. Any one of the client applications can provide a user with one or more services. It is worthwhile to note that since the client applications are deployed in the REE, it is possible that the client applications would be attacked when providing the user with services, which means that there are risks. Therefore, the client application can request the trusted application to execute some services with higher security needs among one or more services provided by the client application.

The TEE in FIG. 1 is a trusted environment that a plurality of trusted applications can be deployed. Each trusted application can externally provide one or more secure services. Specifically, several interfaces can be pre-abstracted for the trusted application, where each interface corresponds to one functional unit of the trusted application. The several interfaces are externally exposed, such that the client application can request the trusted application to execute a certain secure service by invoking a combination of the previously mentioned several interfaces. Here, the secure service includes, but is not limited to key management, data storage or biological recognition.

In a specific example, the client application can transmit a service request to the trusted application through an underlying agent application deployed in the REE, and receives the processing result of the service request from the agent application. It is worthwhile to note that the agent application here can verify the source of the service request, for example, the service request can be transmitted to the trusted application only when the transmitting party of the service request is a specified client application (for example, a payment application). The agent application can intercept the service request when the verification of the service request failed. Thus, it can be ensured that only the specified client application can transmit the service request to the agent application.

In addition, the following pre-processing of each service to be requested by the previously described client application to the trusted application can be executed: a source code corresponding to the service can be analyzed through a pre-determined analysis program at a compiling phase of the client application, and a plurality of target interfaces needed to be invoked to execute the service and the invoking sequence of the plurality of target interfaces can be determined with reference to functional units corresponding to respective interfaces provided by the trusted application. In addition, input parameters (referred to as pre-determined parameters below) of at least part of the plurality of target interfaces can be also determined. Afterwards, the service can be respectively processed based on whether the processing flow of the service can be interrupted.

For example, when the processing flow of the service cannot be interrupted, the determined plurality of target interfaces can be sorted based on the invoking sequence, and the sorted plurality of target interfaces can be solidified in the client application, such that the sorted plurality of target interfaces can be invoked when the user triggers the client application to execute the service. When the processing flow of the service can be interrupted, the expressions with functions equivalent to the functions of the source code of the service can be compiled based on the determined plurality of target interfaces and the invoking sequence of the determined plurality of target interfaces, and solidified in the client application, such that the expressions can be invoked when the user triggers the client application to execute the service.

It is worthwhile to note that the control portion of the processing flow of each service to be requested can be deployed in the REE to the maximum extent by executing the previously described pre-processing, thus improving the flexibility of service request processing and reducing the compilation complicity and maintenance cost of the trusted application at the same time.

When the previously described pre-processing is pre-executed, that is, when the plurality of target interfaces or expressions corresponding to each service to be requested are pre-solidified in the client application, the process that the client application requests the trusted application to execute a certain service can be as follows.

First, the service request processing flow which cannot be interrupted, which means that the plurality of target interfaces of a service to be requested are solidified in the client application, is taken as an example to explain the process that the client application requests the trusted application to execute the service.

Figure 2:
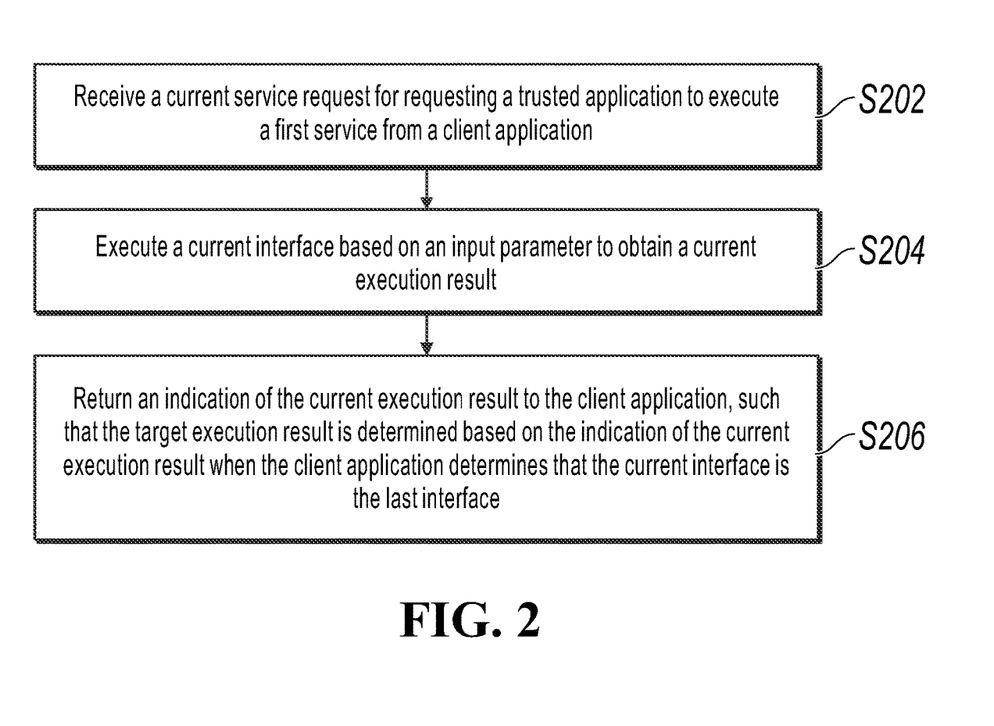
FIG. 2 is a flowchart illustrating a secure service request processing method, according to some embodiments of the present specification.

FIG. 2 is a flowchart illustrating a secure service request processing method, according to some embodiments of the present specification. Execution bodies of the method can be devices with processing capabilities, such as servers, systems, and applications, for example, any trusted application in FIG. 1. As shown in FIG. 2, the method can specifically include the following:

Step 202, a current service request for requesting a trusted application to execute a first service is received from a client application.

First, the first service here refers to a service corresponding to a service request processing flow which cannot be interrupted. Or, the first service here refers to a service that a plurality of target interfaces are solidified in the client application, for example, the service can be key management, data storage, data signing, etc.

In addition, the current service request can be transmitted by the client application when the client application invokes a current interface. Here, the current interface can be any one of the plurality of target interfaces that are pre-obtained by the client application, related to the first service, and in a specified invoking sequence. The current service request can include the current interface and an input parameter of the current interface. The method for determining the input parameter of the current interface will be described later.

Figure 3:
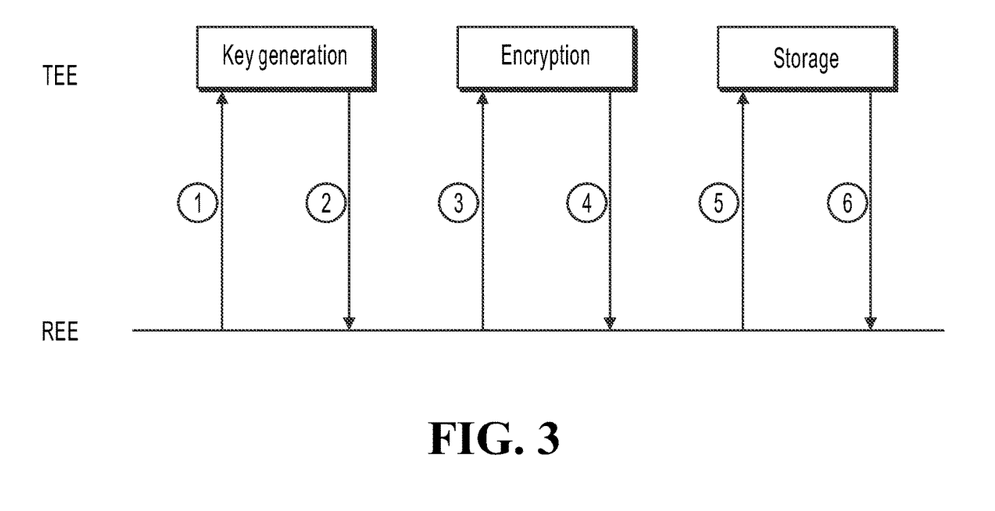
FIG. 3 is a schematic flowchart illustrating a processing flow of key management, according to the present specification.

Taking the first service which is key management as an example, the processing flow of key management can be shown in FIG. 3. In FIG. 3, the plurality of target interfaces related to key management can include: a key generating interface, an encryption interface and a storage interface. The current interface can be any one of the three target interfaces.

Step 204, the current interface is executed based on the input parameter to obtain a current execution result.

For the three target interfaces in FIG. 3, the input parameter of the key generating interface is a key generating algorithm (Algorithm) which can be a pre-determined parameter obtained by analyzing a source code of the service at a compiling phase. The execution result of the key generating interface is a public and private key pair (KeypairRef). The input parameter of the encryption interface is an encryption key (pin) and a public and private key pair. The encryption key can be a pre-determined parameter. The execution result of the encryption interface is a ciphertext (Encrypted) of the key pair. The input parameter of the storage interface is a ciphertext identifier (Alias) and a ciphertext of a key pair. The ciphertext identifier can be a pre-determined parameter.

From the previously described examples, it can be understood that the input parameter of each interface is determined based on at least the following information: the execution result of the previous interface, the pre-determined parameter, etc. Of course, in practice, other data, for example, data input by a user, can also be combined to determine the input parameter of each interface, which is not limited to what is in the present specification.

Step 206, an indication of the current execution result is returned to the client application, such that client application determines a target execution result based on the indication of the current execution result when determining that the current interface is the last interface.

It is worthwhile to note that to ensure security of request service processing, the trusted application can return the indication of the current execution result of the current interface to the client application after executing the current interface based on the input parameter. Here, the indication of the current execution result can be an identifier of the current execution result (for example, a handle (a 16-bit unsigned integer)) or a position identifier. For example, the indication of the current execution result returned to the client application can be a handle of the public and private key pair when the current interface is the key generating interface.

It should be understood that when the indication of the execution result of the client application interface is returned, the input parameter of each interface is determined based on at least the following information: data input by the user, the pre-determined parameter and the indication of the execution result of the previous interface.

After receiving the indication of the current execution result, the client application can determine whether the current interface is the last one of the plurality of previously described interfaces, if not, update the interface subsequent to the current interface as the current interface, determine the input parameter of the updated current interface, and transmit a current service request again for the updated current interface. That is, step 202 to step 206 are repeatedly executed until reaching the last interface.

If determining that the current interface is the last interface, the client application determines the target execution result based on the indication of the current execution result. For example, when the current execution result is non-sensitive data, the current execution result can be obtained from the trusted application based on the indication of the current execution result, and used as the target execution result. When the current execution result is sensitive data, the ciphertext of the current execution result can be obtained from the trusted application based on the indication of the current execution result, and used as the target execution result.

Still taking FIG. 3 as an example, if the current interface is the key generating interface, a received handle of a public and private key pair can be used as the input parameter of the encryption interface. If the current interface is the storage interface, since the cyphertext identifier is non-sensitive data, the cyphertext identifier can be obtained based on the handle of the cyphertext identifier after the handle is received. It should be understood that the cyphertext identifier here is the target execution result of the key management service.

Figure 4:
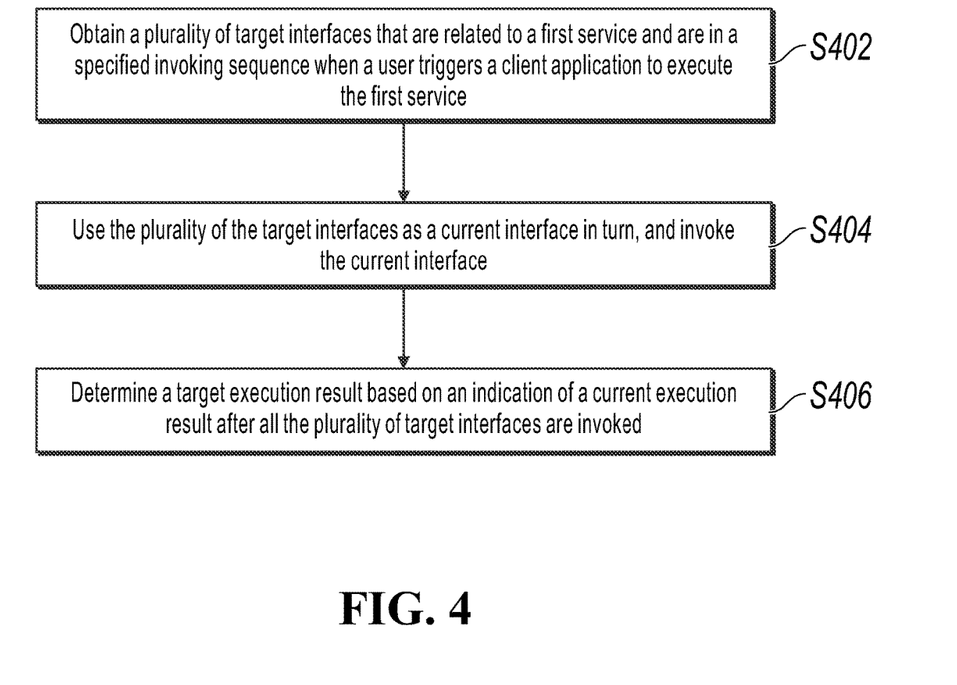
FIG. 4 is a flowchart illustrating a secure service request processing method, according to some embodiments of the present specification.

FIG. 4 is a flowchart illustrating a secure service request processing method, according to some embodiments of the present specification. Execution bodies of the method can be devices with processing capabilities, such as servers, systems and applications, for example, any client application in FIG. 1. As shown in FIG. 4, the method can specifically include the following:

Step 402, a plurality of target interfaces that are related to a first service and are in a specified invoking sequence are obtained when a user triggers a client application to execute the first service.

First, the first service here refers to a service corresponding to a service request processing flow which cannot be interrupted. Or, the first service here refers to a service that a plurality of target interfaces are solidified in the client application, for example, the service can be key management, data storage, data signing, etc.

When the first service is key management, and the processing flow of the first service is shown in FIG. 3, the plurality of target interfaces related to the first service can include: a key generating interface, an encryption interface and a storage interface.

Step 404, the plurality of target interfaces are used as a current interface in turn, and the current interface is invoked.

Here, the step that the current interface is invoked can include the following: an input parameter of the current interface is determined. A current invoking request includes the current interface and the input parameter of the current interface is transmitted to a trusted application. An indication of a current execution result returned by the trusted application is received after the trusted application executes the current interface based on the input parameter.

The step that the input parameter of the current interface is determined specifically includes the following: the input parameter of the current interface is determined based on at least one of data input by a user, a pre-determined parameter and an indication of an execution result of a previous interface. In a specific example, if the current interface is the first interface among the plurality of target interfaces, the input parameter of the current interface can be determined based on the data input by the user and/or the pre-determined parameter. For example, when the current interface is the key generating interface, the input parameter of the key generating interface is determined based on the pre-determined parameter, namely key generating algorithm. If the current interface is any second interface other than the first interface, the input parameter of the current interface can be determined based on the data input by the user, the pre-determined parameter and/or the indication of the execution result of the previous interface. For example, when the current interface is the encryption interface, the input parameter of the encryption interface is determined based on a handle of a public and private key pair generated by the key generating interface and a customized parameter, namely encryption key (pin).

In addition, the received indication of the current execution result can be the handle of the public and private key pair when current interface is the key generating interface. For another example, the received indication of the current execution result can be a handle of a ciphertext of a key pair, etc. when the current interface is the encryption interface.

Step 406, after all the plurality of target interfaces are invoked, the target execution result is determined based on the indication of the current execution result.

For example, when the current execution result is non-sensitive data, the current execution result can be obtained from the trusted application based on the indication of the current execution result, and used as the target execution result. When the current execution result is sensitive data, the ciphertext of the current execution result can be obtained from the trusted application based on the indication of the current execution result, and used as the target execution result.

Still taking FIG. 3 as an example, the received indication of the current execution result is the handle of the cyphertext identifier after all the three target interfaces are invoked. Since the cyphertext identifier is non-sensitive data, the cyphertext identifier can be obtained based on the handle. It should be understood that the cyphertext identifier here is the target execution result of the key management service.

From the previous two embodiments, it can be understood that when the service request processing flow cannot be interrupted, the control portion (selection and sorting of target interfaces) of the service request processing flow is deployed in a rich execution environment (REE), while data is circulated among respective interfaces in a trusted execution environment (TEE). Or, the REE can invoke respective interfaces in the TEE, but cannot directly reach intermediate data during interface calculation and even result data, and can only have the indication of the execution result. Therefore, flexibility of service requests and data security are ensured at the same time.

The service request processing flow which cannot be interrupted is described previously. The service request processing flow which can be interrupted is described below. That is, the client application solidified with expressions of a service to be requested is taken as an example to explain the process that the client application requests a service from the trusted application.

Figure 5:
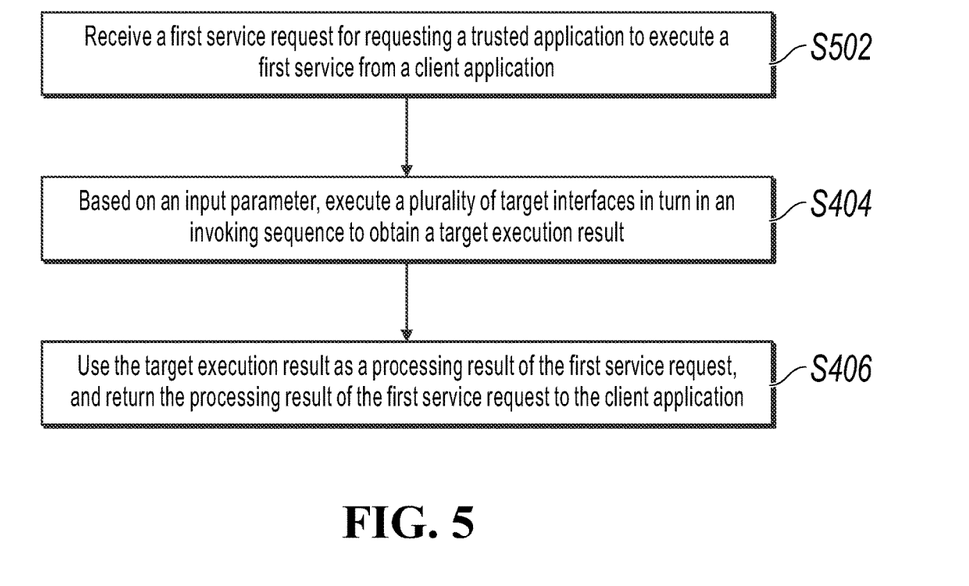
FIG. 5 is a flowchart illustrating a secure service request processing method, according to some embodiments of the present specification.

FIG. 5 is a flowchart illustrating a secure service request processing method, according to some embodiments of the present specification. Execution bodies of the method can be devices with processing capabilities, such as servers, systems and applications, for example, any trusted application in FIG. 1. As shown in FIG. 5, the method can specifically include the following:

Step 502, a first service request for requesting a trusted application to execute a first service is received from a client application.

First, the first service here refers to a service corresponding to a service request processing flow which can be interrupted. Or, the first service here refers to a service that a client application is solidified with expressions, for example, the service can be fingerprint payment, facial recognition payment, iris recognition payment, etc.

Specifically, the client application can obtain a first expression corresponding to the first service when a user triggers the client application to execute the first service. Here, the first expression can specify a plurality of target interfaces related to the first service and an invoking sequence of the plurality of target interfaces. Afterwards, an input parameter of the first expression can be determined. Finally, the first service request including the first expression and the input parameter of the first expression can be transmitted to the trusted application.

Figure 6:
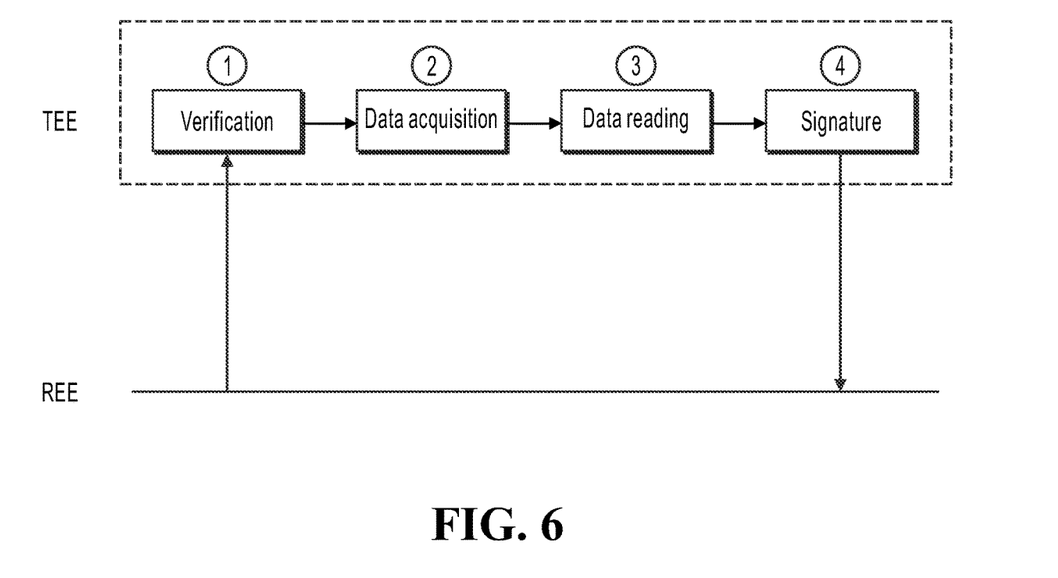
FIG. 6 is a schematic flowchart illustrating processing flow of fingerprint payment, according to the present specification.

Taking the first service which is fingerprint payment as an example, the processing flow of fingerprint payment can be shown in FIG. 6. In FIG. 6, the plurality of target interfaces related to fingerprint payment can include: a verification interface (verify( )), a data acquisition interface (get( )), a data reading interface (read( )) and a signing interface (sign ( )). In one example, these target interfaces can be compiled into the following expressions:
(if(verify(source,signature))
    (setq auth_info(get_lastest_auth_info))
    (if(auth_info)
    (return(sign(read        key_alias)(concat        challenge auth_info)))
    (return nil)
    )
    (return nil)
)

From the previous expressions, it can be understood that the invoking sequence of the previous four interfaces can be: verification interface, data acquisition interface, data reading interface and signing interface.

The input parameter of the previous first expression can include any one of the following: data input by a user (for example, fingerprint information) or a pre-determined parameter (for example, interaction information between the client application and a server: challenge information, a ciphertext identifier, etc.). The input parameter of the expression in the previous example can include: fingerprint information of the user, challenge information (challenge) issued by the server (including an original text of the challenge and a challenge result signature) and a ciphertext identifier (Alias).

Step 504, based on the input parameter, the plurality of target interfaces are executed in turn in the invoking sequence to obtain a target execution result.

Specifically, a first parameter of a first interface among the plurality of target interfaces is determined based on the input parameter, and the first interface is executed by using the first parameter. A second parameter of any second interface other than the first interface is determined based on the input parameter and/or an execution result of a previous interface, and the second interface is executed by using the second parameter. When the second interface is the last interface, the execution result of the last interface is used as the target execution result.

For example, the challenge information can be used as the input parameter of the verification interface (namely the first interface) in the previously described expression, and the verification interface is executed by using the challenge information. The execution result of the verification interface is verification passed or verification failed. It should be understood that execution directly exits if the verification fails. The fingerprint information of the user can be used as the input parameter of the data acquisition interface, and the data acquisition interface can be executed by using the fingerprint information. The execution result of the data acquisition interface can be fingerprint identification passed or fingerprint identification failed. Then, the ciphertext identifier can be used as the input parameter of the data reading interface, and the data reading interface can be executed by using the ciphertext identifier. The execution result of the data reading interface is a signed private key. The signed private key and the execution result (namely fingerprint identification passed or fingerprint identification failed) of the data acquisition interface can be used as the input parameter of the signing interface, and the signing interface is executed by using the signed private key and the execution result of the data acquisition interface. The execution result of the signing interface is a signed fingerprint identification result.

It is worthwhile to note that these interfaces may be attacked when the trusted application externally exposes several interfaces. Therefore, these interfaces are numbered in the present application, and each time one interface is executed, a serial number corresponding to the interface is recorded, such that the correctness of the processing result of the first service request is verified based on the recorded serial number. Specifically, a serial number of any first interface among the plurality of target interfaces is recorded when or after the any first interface among the plurality of target interfaces is executed in turn in the invoking sequence. A serial number sequence is formed based on the recorded serial number of each interface after, all the plurality of target interfaces are invoked. The processing result of the first service request and the serial number sequence are returned to the client application, such that the client application verifies the correctness of the processing result of the first server request based on the serial number sequence.

In an optional example, the trusted application can also sign the serial number sequence by using a pre-generated private key to obtain a signed serial number sequence. Afterwards, the processing result of the first service request and the signed serial number sequence are returned to the client application, so that the client application can perform correctness verification based on the processing result of the first server request after passing the verification of the signed serial number sequence.

Still taking the previously described fingerprint payment as example. It is assumed that the verification interface, the data acquisition data, the data reading interface, and the signing interface correspond to serial number 1, 2, 3, and 4, respectively. Then, the formed serial number sequence can be: (1, 2, 3, 4) after the execution result of the first expression. If the first service request is also numbered, for example the serial number is 0, the formed serial number sequence can be: (0, 1, 2, 3, 4). It should be understood that when assuming that the currently returned serial number sequence is: (0, 4), it is deemed that the processing result of the first service request is abnormal data.

Step 506, the target execution result is used as the processing result of the first service request, and the processing result of the first service request is returned to the client application.

As mentioned in the previously described fingerprint identification example, the signed fingerprint identification result is the processing result of the first service request.

The step that the processing result of the first service request is returned to the client application includes the following: whether the processing result is sensitive data is determined. If yes, the processing result is encrypted to obtain the ciphertext of the processing result. The ciphertext of the processing result is returned to the client application. Here, the sensitive data includes, but is not limited to key data, token data, etc.

Figure 7:
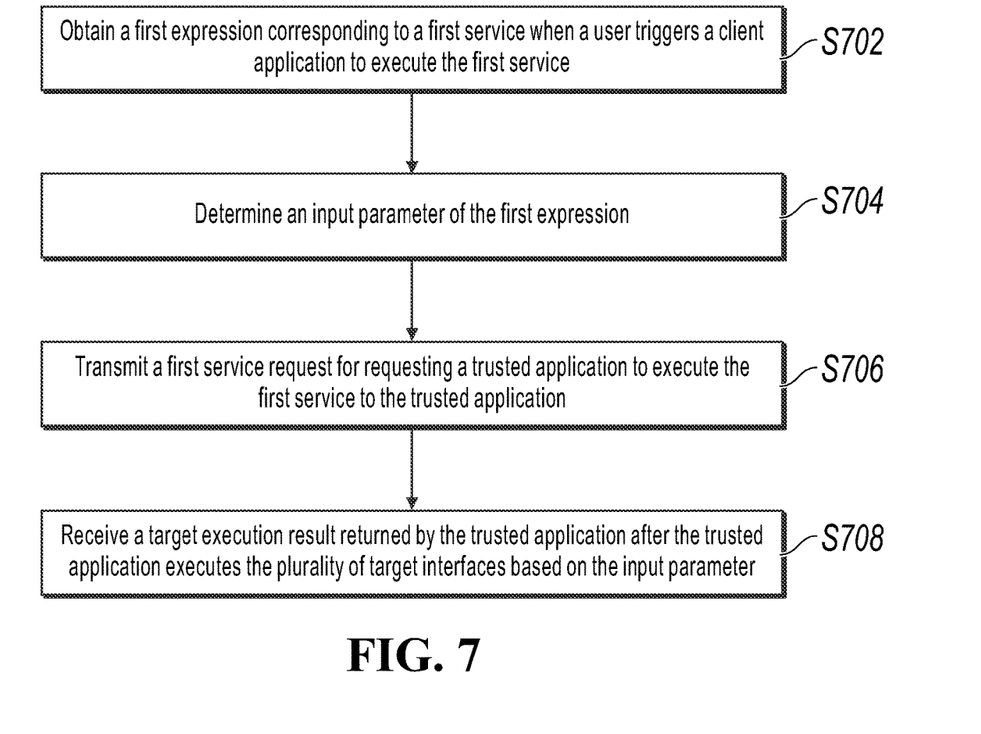
FIG. 7 is a flowchart illustrating a secure service request processing method, according to some embodiments of the present specification.

FIG. 7 is a flowchart illustrating a secure service request processing method, according to some embodiments of the present specification. Execution bodies of the method can be devices with processing capabilities, such as servers, systems and applications, for example, any client application in FIG. 1. As shown in FIG. 7, the method can specifically include the following:

Step 702, a first expression corresponding to a first service is obtained when a user triggers a client application to execute the first service.

First, the first service here refers to a service corresponding to a service request processing flow which can be interrupted. Or, the first service here refers to a service that a client application is solidified with expressions, for example, the service can be fingerprint payment, facial recognition payment, iris recognition payment, etc.

Specifically, the client application can obtain a first expression corresponding to the first service when a user triggers the client application to execute the first service. Here, the first expression can specify a plurality of target interfaces related to the first service and an invoking sequence of the plurality of target interfaces. Afterwards, an input parameter of the first expression can be determined. Finally, the first service request including the first expression and the input parameter of the first expression can be transmitted to the trusted application.

Step 704, the input parameter of the first expression is determined.

Specifically, the input parameter of the first expression can be determined based on data input by a user (for example, fingerprint information), a pre-determined parameter (for example, interaction information between the client application and a server: challenge information, ciphertext identifier, etc.), etc.

Step 706, a first service request for requesting the trusted application to execute the first service is transmitted to the trusted application.

Here, the first service request includes the first expression and the input parameter.

Based on the input parameter, the trusted application executes the plurality of target interfaces in turn in the invoking sequence after receiving the first service request, so as to obtain a target execution result.

Specifically, a first parameter of a first interface among the plurality of target interfaces is determined based on the input parameter, and the first interface is executed by using the first parameter. A second parameter of any second interface other than the first interface is determined based on the input parameter and/or an execution result of a previous interface, and the second interface is executed by using the second parameter. When the second interface is the last interface, the execution result of the last interface is used as the target execution result.

Specifically, the trusted application can determine whether the target execution result is sensitive data. If yes, the target execution result is encrypted to obtain a ciphertext of the target execution result. The ciphertext of the target execution result is returned to the client application. Here, the sensitive data includes, but is not limited to key data, token data, etc.

Step 708, the target execution result returned by the trusted application is received after the trusted application executes the plurality of target interfaces based on the input parameter.

It should be understood that the target execution result here is a processing result of the first service request, which can be either a plaintext or a ciphertext.

It is worthwhile to note that these interfaces may be attacked when the trusted application externally exposes several interfaces. Therefore, these interfaces are numbered in the present application, and each time one interface is executed, a serial number corresponding to the interface is recorded, such that the correctness of the processing result of the first service request is verified based on the recorded serial number. Specifically, a serial number of any first interface among the plurality of target interfaces is recorded when or after the any first interface among the plurality of target interfaces is executed in turn in the invoking sequence. A serial number sequence is formed based on the recorded serial number of each interface after all the plurality of target interfaces are invoked. The processing result of the first service request and the serial number sequence are returned to the client application, such that the client application verifies the correctness of the processing result of the first server request based on the serial number sequence.

In an optional example, the trusted application can also sign the serial number sequence by using a pre-generated private key to obtain a signed serial number sequence. Afterwards, the processing result of the first service request and the signed serial number sequence are returned to the client application. The client application can then perform correctness verification based on the processing result of the first server request after passing the verification of the signed serial number sequence.

From the previous two embodiments, it can be understood that after the client application transmits the expression and the input parameter of the expression to the trusted application at a time, the trusted application does not interact with the client application any more during expression execution. That is, part of the control portion of the service request processing flow is deployed in the TEE, such that the security of service request processing can be ensured. However, the expression is still compiled in the REE. For example, the target interfaces specified in the expression and the compiling sequence of the target interfaces are directly modified without modification of the trusted application when the service request changes. Therefore, the flexibility of service request processing is ensured. In all, the present solution can ensure both security and flexibility of service request processing.

In conclusion, firstly, the present solution can abstract the capabilities of the TEE to abstract interfaces which are exposed to be invoked by the REE. Secondly, the present solution can separate the control portion and data portion of the service request processing flow. The control portion is deployed in the REE. Except the input, intermediate results of the service request are always circulated in the TEE, thereby satisfying the majority of security needs and greatly reducing the complexity of the trusted application. Reducing the complexity means an increase in maintenance cost, reliability and security. Thirdly, when the service request processing flow cannot be interrupted, evaluation of the expression is adopted, which means that the expression and the input parameter of the expression are input to the TEE. In the TEE, the input parameter is introduced into the expression for evaluation. As such, the plurality of target executions are executed based on the way specified by the expression, which means that the control portion is deployed in the TEE to ensure the atomicity of sub-processes. Finally, since the interfaces are completely exposed to be directly used by the REE, the serial number sequence is formed to track the processing result of the service request, thus preventing malicious attackers from faking output data.

Figure 8:
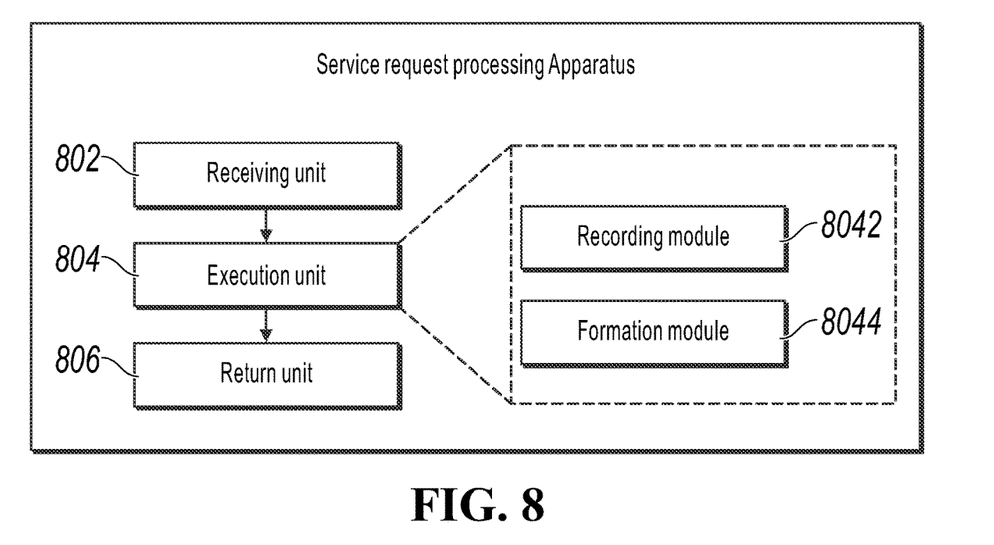
FIG. 8 is a schematic diagram illustrating a secure service request processing apparatus, according to some embodiments of the present specification.

Corresponding to the previous secure service request processing methods, some embodiments of the present specification further provide a secure service request processing apparatus, arranged at a trusted application that is deployed in a TEE of an end-user device. The trusted application externally provides several interfaces, and each interface corresponds to one functional unit of the trusted application. The previous end-user device further includes an REE, and a client application is deployed in the REE. As shown in FIG. 8, the apparatus can include a receiving unit 802, an execution unit 804 and a return unit 806.

The receiving unit 802 is configured to receive a first service request for requesting the trusted application to execute a first service from the client application. The first service request includes a first expression and an input parameter of the first expression, and the first expression specifies a plurality of target interfaces related to the first service and an invoking sequence of the plurality of target interfaces.

Here, the first service can include any one of the following: fingerprint payment, facial recognition payment, and iris recognition payment.

The execution unit 804 is configured to invoke, based on the input parameter, the plurality of target interfaces in turn in the invoking sequence to obtain a target execution result.

The execution unit 804 can be specifically configured to:

determine a first parameter of a first interface among the plurality of target interfaces based on the input parameter, and execute the first interface by using the first parameter; and A second parameter of any second interface other than the first interface is determined based on the input parameter and/or an execution result of a previous interface, and the second interface is executed by using the second parameter.

When the second interface is the last interface, the execution result of the last interface is used as the target execution result.

The return unit 806 is configured to use the target execution result as a processing result of the first service request, and return the processing result of the first service request to the client application.

The return unit 806 is specifically configured to:

determine whether the target execution result is sensitive data;

if yes, encrypt the processing result to obtain a ciphertext of the processing result; and return the ciphertext of the processing result to the client application.

Optionally, each of the plurality of previous interfaces corresponds to one serial number, and the execution unit 804 includes:

a recording module 8042, configured to record a serial number of any first interface among the plurality of target interfaces when or after executing the any first interface among the plurality of target interfaces in turn in the invoking sequence; and a formation module 8044, configured to form a serial number sequence based on the recorded serial number of each interface after all the plurality of target interfaces are invoked.

The return unit 806 is further specifically configured to:

return the processing result of the first service request and the serial number sequence to the client application, such that the client application verifies the correctness of the processing result of the first service request based on the serial number sequence.

The return unit 806 is further specifically configured to:

sign the serial number sequence by using a pre-generated private key to obtain a signed serial number sequence; and return the processing result of the first service request and the signed serial number sequence to the client application.

The functions of all functional modules of apparatuses according to the previous embodiments of the present specification can be implemented by the steps of the previous method embodiments. Therefore, the specific working process of apparatuses according to some embodiments of the present specification are omitted in the present specification.

The secure service request processing apparatuses according to some embodiments of the present specification can not only improve the flexibility of service request processing, but also reduce maintenance cost of the trusted application.

Figure 9:
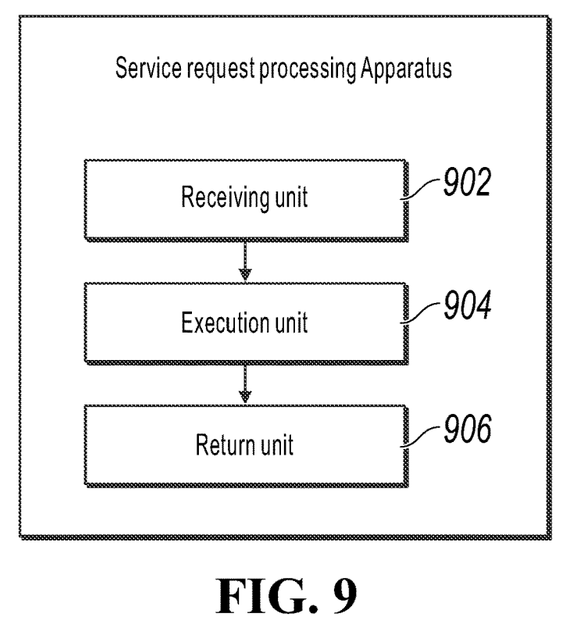
FIG. 9 is a schematic diagram illustrating a secure service request processing apparatus, according to some embodiments of the present specification.

Corresponding to the previous secure service request processing methods, some embodiments of the present specification further provide a secure service request processing apparatus, arranged at a trusted application that is deployed in a TEE of an end-user device. The trusted application externally provides several interfaces, and each interface corresponds to one functional unit of the trusted application. The previous end-user device further includes an REE, and a client application is deployed in the REE. As shown in FIG. 9, the apparatus can include a receiving unit 902, an execution unit 904 and a return unit 906.

The receiving unit 902 is configured to receive a current service request for requesting the trusted application to execute a first service from the client application. The current interface can be any one of a plurality of target interfaces that are related to the first service and are in a specified invoking sequence.

Here, the first service includes any one of key management, data storage and data signing.

The execution unit 904 is configured to execute the current interface based on the input parameter to obtain a current execution result.

The return unit 906 is configured to return an indication of the current execution result to the client application, such that the client application determines a target execution result based on the indication of the current execution result when determining that the current interface is the last interface.

The indication of the current execution result is an identifier of the current execution result or a position identifier.

The functions of all functional modules of apparatuses according to the previous embodiments of the present specification can be implemented by the steps of the previous method embodiments. Therefore, the specific working process of apparatuses according to some embodiments of the present specification are omitted in the present specification.

The secure service request processing apparatuses according to some embodiments of the present specification can not only improve the flexibility of service request processing, but also reduce maintenance cost of the trusted application.

Figure 10:
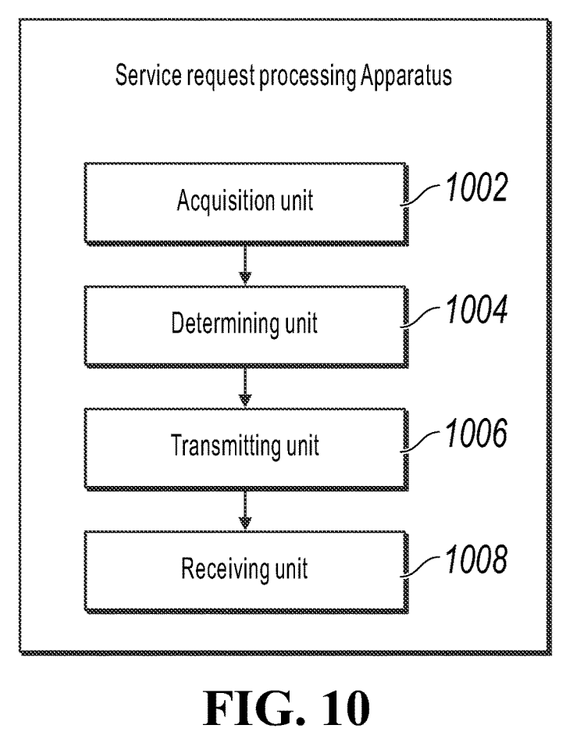
FIG. 10 is a schematic diagram illustrating a secure service request processing apparatus, according to some embodiments of the present specification.

Corresponding to the previous secure service request processing methods, some embodiments of the present specification further provide a secure service request processing apparatus, arranged at a client application that is deployed in a rich execution environment (REE) of an end-user device. The end-user device further includes a trusted execution environment (TEE), and a trusted application is deployed in the TEE. The trusted application externally provides several interfaces, and each interface corresponds to one functional unit of the trusted application. As shown in FIG. 10, the apparatus can include an acquisition unit 1002, a determining unit 1004, a transmitting unit 1006 and a receiving unit 1008.

The acquisition unit 1002 is configured to obtain a first expression related to a first service when a user triggers the client application to execute the first service. The first expression specifies a plurality of target interfaces related to the first service and an invoking sequence of the plurality of target interfaces.

The determining unit 1004 is configured to determine an input parameter of the first expression.

The transmitting unit 1006 is configured to transmit a first service request for requesting the trusted application to execute the first service to the trusted application. The first service request includes the first expression and the input parameter.

The receiving unit 1008 is configured to receive a target execution result returned by the trusted application after the trusted application executes the plurality of target interfaces based on the input parameter.

The functions of all functional modules of apparatuses according to the previous embodiments of the present specification can be implemented by the steps of the previous method embodiments. Therefore, the specific working process of apparatuses according to some embodiments of the present specification are omitted in the present specification.

The secure service request processing apparatuses according to some embodiments of the present specification can not only improve the flexibility of service request processing, but also reduce maintenance cost of the trusted application.

Figure 11:
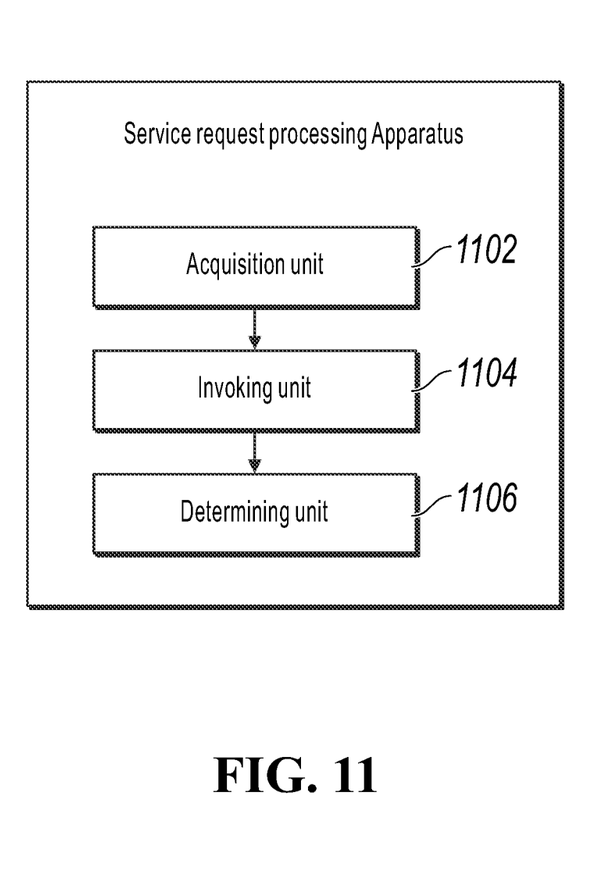
FIG. 11 is a schematic diagram illustrating a secure service request processing apparatus, according to some embodiments of the present specification.

Corresponding to the previous secure service request processing methods, some embodiments of the present specification further provide a secure service request processing apparatus, arranged at a client application that is deployed in an REE of an end-user device. The end-user device further includes a TEE, and a trusted application is deployed in the TEE. The trusted application externally provides several interfaces, and each interface corresponds to one functional unit of the trusted application. As shown in FIG. 11, the apparatus can include an acquisition unit 1102, an invoking unit 1104, and a determining unit 1106.

The acquisition unit 1102 is configured to obtain a plurality of target interfaces that are related to a first service and are in a specified invoking sequence when a user triggers the client application to execute a first service.

The invoking unit 1104 is configured to use the plurality of target interfaces as a current interface in turn, and invoke the current interface. The step that the current interface is invoked includes the following: an input parameter of the current interface is determined. A current invoking request including the current interface and the input parameter of the current interface is transmitted to the trusted application. An indication of a current execution result returned by the trusted application is received after the trusted application executes the current interface based on the input parameter.

The determining unit 1106 is configured to determine a target execution result based on the indication of the current execution result after all the plurality of target interfaces are invoked.

The functions of all functional modules of apparatuses according to the previous embodiments of the present specification can be implemented by the steps of the previous method embodiments. Therefore, the specific working process of apparatuses according to some embodiments of the present specification are omitted in the present specification.

The secure service request processing apparatuses according to some embodiments of the present specification can not only improve the flexibility of service request processing, but also reduce maintenance cost of the trusted application.

According to another aspect, some embodiments of the present specification provide a computer readable storage, which stores computer programs, where when the computer programs are executed in a computer, the computer implements the method as shown in FIG. 2, FIG. 4, FIG. 5 or FIG. 7.

According to another aspect, some embodiments of the present specification provide a computing device, including a memory and a processor, where the memory stores executable codes, and when executing the executable codes, the processor implements the method as shown in FIG. 2, FIG. 4, FIG. 5 or FIG. 7.

The embodiments in the present specification are described in a progressive way. For same or similar parts of the embodiments, references can be made to the embodiments. Each embodiment focuses on a difference from other embodiments. Particularly, a device embodiment is similar to a method embodiment, and therefore is described briefly. For related parts, references can be made to related descriptions in the method embodiment.

The methods or algorithm steps described with reference to the content disclosed in the present specification can be implemented in a hardware method, or can be implemented in a method in which a processor executes a software instruction. The software instruction can be formed by a corresponding software module, and the software module can be stored in a RAM memory, a flash memory, a ROM memory, an EPROM memory, an EEPROM memory, a register, a hard disk, a removable hard disk, a CD-ROM, or any other form of storage medium well known in the art. An example storage medium is coupled to the processor, so the processor can read information from the storage medium and can write information to the storage medium. Certainly, the storage medium can also be a part of the processor. The processor and the storage medium can be located in an ASIC. In addition, the ASIC can be located in a server. Certainly, the processor and the storage medium can also exist in the server as separate parts.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium. The computer readable medium includes a computer storage medium and a communication medium, where the communication medium includes any medium that facilitates the transfer of a computer program from one place to another. The storage medium can be any available medium accessible to a general-purpose or dedicated computer.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or may be advantageous.

The objectives, technical solutions, and benefits of the present specification are further described in detail in the previously described specific implementations. It should be understood that the previously described descriptions are merely specific implementations of the present specification, but are not intended to limit the protection scope of the present specification. Any modification, equivalent replacement, or improvement made based on the technical solutions of the present specification shall fall within the protection scope of the present specification.

What is claimed is:

1. A method for processing service requests comprising:
receiving, from a client application and by a trusted application, a first service request for executing a first service by the trusted application, wherein the first service request comprises a first expression and an input parameter of the first expression, and the first expression specifies a plurality of target interfaces related to the first service and a sequence of the plurality of target interfaces;
executing, by the trusted application and based on the input parameter, the plurality of target interfaces according to the sequence to obtain a target execution result; and
returning, by the trusted application to the client application, the target execution result responsive to the first service request;
wherein executing, by the trusted application and based on the input parameter, the plurality of target interfaces according to the sequence to obtain a target execution result comprises:
determining, based on the input parameter, a first parameter of a first interface among the plurality of target interfaces, and executing the first interface by using the first parameter; and
determining, based on at least one of the input parameter and an execution result of a previous interface, a second parameter of any second interface other than the first interface, and executing the second interface by using the second parameter,
wherein, in response to determining the second interface is a last interface, an execution result of the last interface is the target execution result.

2. The method according to claim 1, wherein each of the plurality of target interfaces comprises a serial number, wherein executing, by the trusted application and based on the input parameter, the plurality of target interfaces according to the sequence to obtain the target execution result comprises:

recording a first serial number of a first interface among the plurality of target interfaces during or after executing the first interface among the plurality of target interfaces according the sequence; and
generating, a serial number sequence based on a recorded serial number of each interface of the plurality of target interfaces; and
wherein returning by the trusted application to the client application, the target execution result responsive to the first service request comprises:
returning, by the trusted application to the client application, the serial number sequence.

3. The method according to claim 2, wherein returning, by the trusted application to the client application, the serial number sequence comprises:
signing the serial number sequence with a pre-generated private key to obtain a signed serial number sequence; and
returning the signed serial number sequence to the client application.

4. The method according to claim 1, wherein returning, by the trusted application, the target execution result responsive to the first service request comprises:
in response to determining that the target execution result is sensitive data, encrypting the target execution result to obtain a ciphertext of the target execution result; and
returning the ciphertext of the target execution result to the client application.

5. The method according to claim 1, wherein the first service comprises one or more of the following: a fingerprint payment, a facial recognition payment, and an iris recognition payment.

6. The method according to claim 1, wherein the client application is deployed in a rich execution environment (REE) of an end-user device, and wherein the trusted application is deployed in a trusted execution environment (TEE) of the end-user device.

7. A non-transitory, computer-readable medium storing one or more instructions executable by a computer system to perform operations for processing service requests, the operations comprising:
receiving, from a client application and by a trusted application, a first service request for executing a first service by the trusted application, wherein the first service request comprises a first expression and an input parameter of the first expression, and the first expression specifies a plurality of target interfaces related to the first service and a sequence of the plurality of target interfaces;
executing, by the trusted application and based on the input parameter, the plurality of target interfaces according to the sequence to obtain a target execution result; and
returning, by the trusted application to the client application, the target execution result responsive to the first service request;
wherein executing, by the trusted application and based on the input parameter, the plurality of target interfaces according to the sequence to obtain a target execution result comprises:
determining, based on the input parameter, a first parameter of a first interface among the plurality of target interfaces, and executing the first interface by using the first parameter; and
determining, based on at least one of the input parameter and an execution result of a previous interface, a second parameter of any second interface other than the first interface, and executing the second interface by using the second parameter, wherein, in response to determining the second interface is a last interface, an execution result of the last interface is the target execution result.

8. The non-transitory, computer-readable medium according to claim 7, wherein each of the plurality of target interfaces comprises a serial number, wherein executing, by the trusted application and based on the input parameter, the plurality of target interfaces according to the sequence to obtain the target execution result comprises:

recording a first serial number of a first interface among the plurality of target interfaces during or after executing the first interface among the plurality of target interfaces according the sequence; and generating, a serial number sequence based on a recorded serial number of each interface of the plurality of target interfaces; and wherein returning by the trusted application to the client application, the target execution result responsive to the first service request comprises:

returning, by the trusted application to the client application, the serial number sequence.

9. The non-transitory, computer-readable medium according to claim 8, wherein returning, by the trusted application to the client application, the serial number sequence comprises:

signing the serial number sequence with a pre-generated private key to obtain a signed serial number sequence; and returning the signed serial number sequence to the client application.

10. The non-transitory, computer-readable medium according to claim 7, wherein returning, by the trusted application, the target execution result responsive to the first service request comprises:

in response to determining that the target execution result is sensitive data, encrypting the target execution result to obtain a ciphertext of the target execution result; and returning the ciphertext of the target execution result to the client application.

11. The non-transitory, computer-readable medium according to claim 7, wherein the first service comprises one or more of the following: a fingerprint payment, a facial recognition payment, and an iris recognition payment.

12. The non-transitory, computer-readable medium according to claim 7, wherein the client application is deployed in a rich execution environment (REE) of an end-user device, and wherein the trusted application is deployed in a trusted execution environment (TEE) of the end-user device.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, from a client application and by a trusted application, a first service request for executing a first service by the trusted application, wherein the first service request comprises a first expression and an input parameter of the first expression, and the first expression specifies a plurality of target interfaces related to the first service and a sequence of the plurality of target interfaces;

executing, by the trusted application and based on the input parameter, the plurality of target interfaces according to the sequence to obtain a target execution result; and returning, by the trusted application to the client application, the target execution result responsive to the first service request;

wherein executing, by the trusted application and based on the input parameter, the plurality of target interfaces according to the sequence to obtain a target execution result comprises:

determining, based on the input parameter, a first parameter of a first interface among the plurality of target interfaces, and executing the first interface by using the first parameter; and determining, based on at least one of the input parameter and an execution result of a previous interface, a second parameter of any second interface other than the first interface, and executing the second interface by using the second parameter, wherein, in response to determining the second interface is a last interface, an execution result of the last interface is the target execution result.

14. The computer-implemented system according to claim 13, wherein each of the plurality of target interfaces comprises a serial number, wherein executing, by the trusted application and based on the input parameter, the plurality of target interfaces according to the sequence to obtain the target execution result comprises:

recording a first serial number of a first interface among the plurality of target interfaces during or after executing the first interface among the plurality of target interfaces according the sequence; and generating, a serial number sequence based on a recorded serial number of each interface of the plurality of target interfaces; and wherein returning by the trusted application to the client application, the target execution result responsive to the first service request comprises:

returning, by the trusted application to the client application, the serial number sequence.

15. The computer-implemented system according to claim 14, wherein returning, by the trusted application to the client application, the serial number sequence comprises:

signing the serial number sequence with a pre-generated private key to obtain a signed serial number sequence; and returning the signed serial number sequence to the client application.

16. The computer-implemented system according to claim 13, wherein returning, by the trusted application, the target execution result responsive to the first service request comprises:

in response to determining that the target execution result is sensitive data, encrypting the target execution result to obtain a ciphertext of the target execution result; and returning the ciphertext of the target execution result to the client application.

17. The computer-implemented system according to claim 13, wherein the client application is deployed in a rich execution environment (REE) of an end-user device, and wherein the trusted application is deployed in a trusted execution environment (TEE) of the end-user device.

* * * * *